United States Patent Office 3,555,650
Patented Jan. 19, 1971

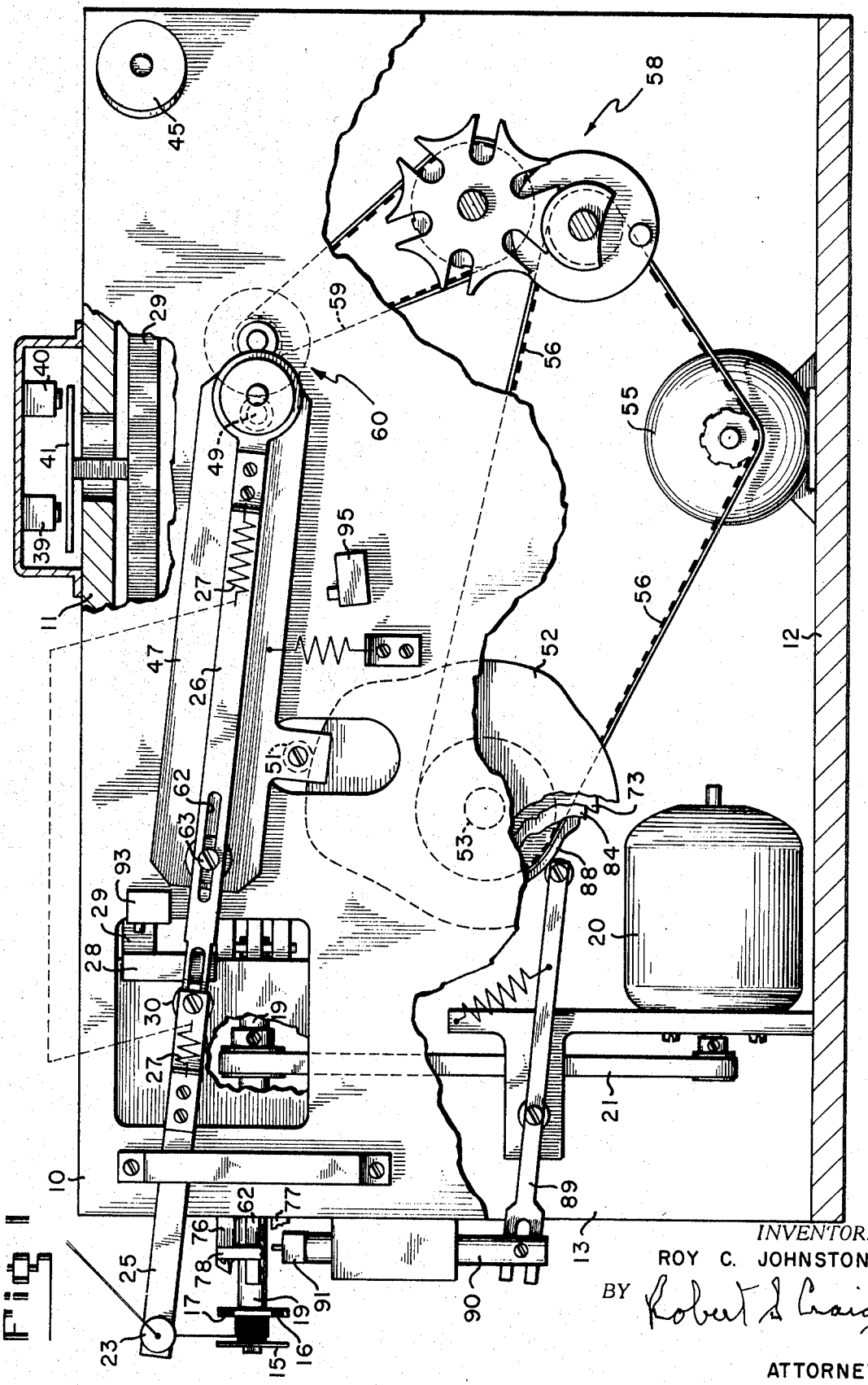

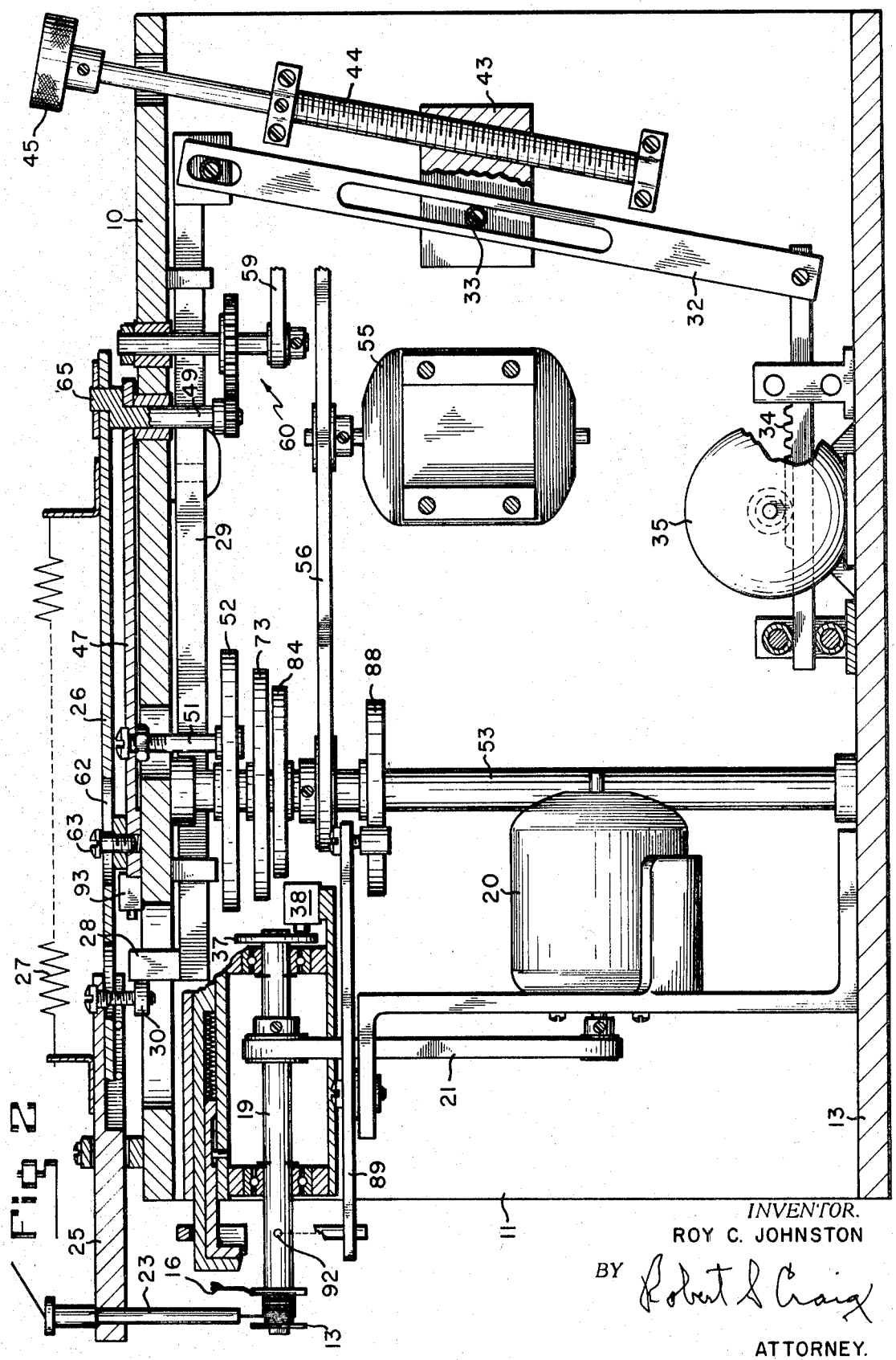

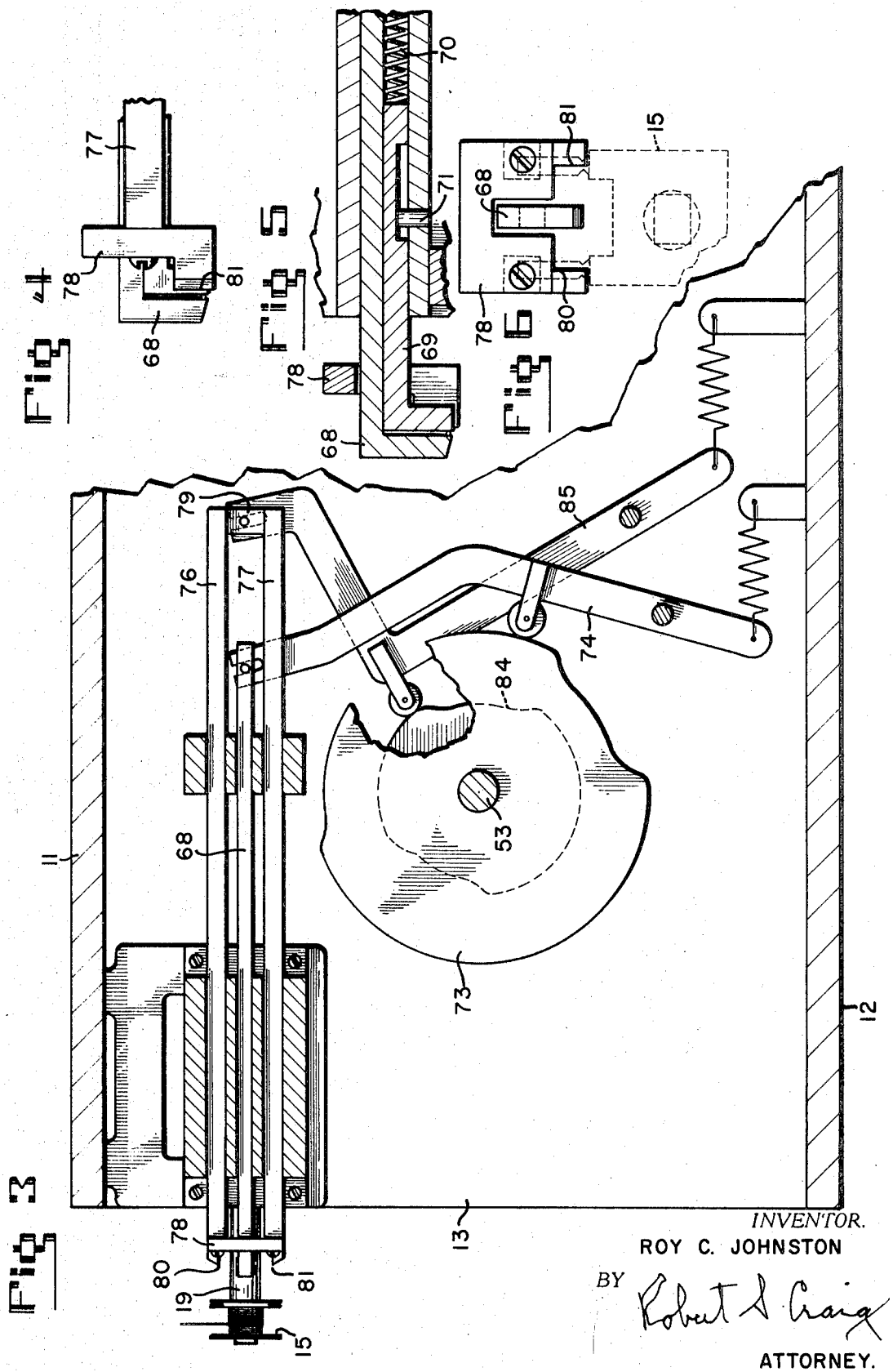

3,555,650
COIL WINDING MACHINE
Roy C. Johnston, Minneapolis, Minn., assignor to Honeywell Inc., Minneapolis, Minn., a corporation of Delaware
Filed Oct. 16, 1968, Ser. No. 768,061
Int. Cl. H05k 13/00
U.S. Cl. 29—203
8 Claims

ABSTRACT OF THE DISCLOSURE

A coil winding machine for winding a coil of wire around a preformed bobbin, with the ends of the coil being wound around two bobbin supported metal terminals. The machine includes a spindle to rotate the bobbin, and a plurality of cams and a Geneva movement to control and to give a plurality of modes of operation to an arm which guides the wire, a wire gripping arrangement and a wire cutting arrangement.

A feature of this coil winding machine is a lever system having a plurality of modes of operation for guiding wire to the bobbin, so that the wire can be directed to level wind the coil and also to wrap the terminals. Another feature is a wire cutting arrangement coordinated with the terminal wrapping arrangement to sever the wire ends at the terminals leaving no tag ends of wire. The coil winding machine is adapted to wind coils of various sizes as well as to properly space wires of different diameters.

IN THE DRAWING

FIG. 1 is a top view, broken away in part, of the coil winding machine.

FIG. 2 is a side view, partly in section, of the coil winding machine of FIG. 1.

FIG. 3 is a top view as seen from above as in FIG. 1, but taken in section below the top plate of the machine.

FIG. 4 is a fragmentary view of the outer ends of the wire cutters and the wire gripper.

FIG. 5 is a view similar to FIG. 4 but taken in section to show details of the wire gripper.

FIG. 6 is a fragmentary front view of the cutters and gripper showing their relation to the bobbin, which is shown in dotted lines.

DESCRIPTION OF THE PREFERRED EMBODIMENT

Figure 7:
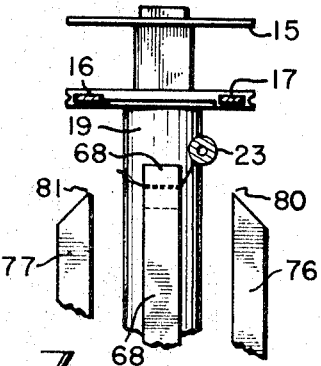
FIGS. 7 through 12 are fragmentary views showing the various steps that take place in winding a coil on a bobbin supported by a spindle.

The frame of the coil winding machine is a box shaped structure consisting of a top plate 10, side plates 11 and 12 and a bottom plate 13.

A preformed bobbin 15 on which the coil is wound has spaced parallel metal terminals 16 and 17 extending at right angles to the horizontal winding axis. The bobbin is mounted on the end of a spindle 19 mounted in the frame for rotation about the horizontal axis. The bobbin is mounted on the spindle by any means that provides easy manual mounting and removal. The spindle is driven by a motor 20 through a belt 21. The bobbin 15 has lead in and lead out slots as described in Brekke et al., U.S. Pat. 3,131,371.

Wire is applied to the bobbin through a wire guide 23. As seen in FIGS. 1 and 2, the machine is in the process of level winding a coil. Wire is directed from a suitable source from above, not shown, through the wire guide, and onto the bobbin. The wire guide is carried by an arm 25 which is slidable longitudinally on the end of a lever 26. A spring 27 biases the arm 25 inwardly, while an abutment 28 on a level wind member 29 is adapted to move the arm 25 outwardly and permit it to move inwardly as required to level wind the coil. The arm 25 is provided with a roller 30 adapted to engage the abutment 28 during the level wind operating sequence of the machine.

The level wind member 29 is guided for reciprocating movement in the frame of the machine and is actuated by a lever 32 seen in FIG. 2. Lever 32 is pivoted on a pin 33 and its lower end is driven by a rack 34 which is guided for reciprocating movement in the frame. A reversible stepping motor 35 drives through rack 34, and lever 32 to drive level wind member 29 in steps equivalent to one wire diameter on signals produced by each revolution of the spindle. The inner end of the spindle 19 carries a disk 37 adapted to actuate a photocell 38 which sends a suitable signal to control apparatus for the stepping motor. The direction of rotation of the stepping motor is controlled by a pair of photocells 39 and 40 (FIG. 1) which sense the position of a plate 41 carried by the level wind member 29. It will be understood that conventional electric switches could be used instead of the photocells with the penalty of slower operation. The pin 33 on which the lever 32 is pivoted is adjustable vertically in the frame. Pin 33 is carried by a block 43 vertically adjustable by a screw 44 that may be turned by a knob 45. The position of pin 33 determines the movement of level wind member 29 for each step of the motor 35 and it is adjusted so that each step of the motor results in movement of the wire guide 23 in an increment equivalent to one wire diameter.

Electric means, not shown, utilizes the output of photocell 40, when uncovered by member 41, to reverse the direction of movement of level wind member 29, causing this member to return to the right, FIG. 1. When movement to the right has progressed to the point where photocell 39 is uncovered by member 41, then the direction of movement of member 29 is again reversed, causing the member to move to the left. This electric means also responds to the output of photocell 38 to step motor 35 one step, and thus the distance of one wire diameter, for each revolution of spindle 19.

The lever 26 on which the arm 25 and wire guide 23 is mounted is carried by a second lever 47 which is pivotally mounted for horizontal positioning on the top plate 10 by a shaft 49 passing vertically through the plate 10. Shaft 49, in addition to pivotally mounting the lever 47, is also adapted to be rotated to move lever 26 with respect to lever 47, as will appear below. The lever 47 is provided with a cam follower 51 that engages a cam 52 on a shaft 53 journaled in the upper end lower plates 10 and 13. A motor 55 drives the shaft 53 through a toothed belt 56 at various times during the coil winding operation. The cam 52 angularly positions levers 47 and 26 to position the wire guide 23 laternally with respect to the bobbin 15 as will appear below.

The motor 55 also drives a Geneva movement 58, which drives a belt 59 and a gear train 60 to rotate shaft 49 in top plate 10. As will appear below, in order to wrap wire about the vertically disposed terminals 16 and 17 of the bobbin it is necessary for the wire guide 23 to be driven in a circular path with respect to a vertical axis. To this end an intermediate portion of the lever 26 is slotted at 62 to receive a pin 63 extending upwardly from lever 47. The right hand end of lever 26 is mounted on a crank 65 on the upper end of shaft 49. When shaft 49 is rotated the crank 65 will drive the right hand end of the lever 26 in a circular path. Since lateral movement of the midpoint of lever 26 is prevented by pin 63 engaging slot 62, longitudinal movement of lever 26 will result in the left hand end of lever 26 describing a path similar to its right hand end. The linkage including the Geneva movement 58 and gear train 60 may suitably be such as to rotate the crank 65 three turns while the cam 52 is turning through 60 angular degrees, during which time the surface of cam 52 that positions lever 47 is of constant radius. This will occur twice for each 360° rotation of cam 52, once to wrap each of the two bobbin terminals.

A wire gripping and a wire cutting arrangement is shown best in FIGS. 3 through 6. As seen in FIG. 5, the wire gripper consists of a driven jaw member 68 and a cooperating jaw member 69. A spring 70 biases the jaws together but a pin 71 carried by the frame is located to stop movement of member 69 on extended left hand movement of member 68. This serves to separate the jaws so that the remnant or tag end of wire held between them can drop out and to permit the jaws to grasp a new wire length, as will appear below. The member 68 is driven by a cam 73 (FIG. 3) on shaft 53 by a lever 74 pivotally mounted in the frame. The operating sequence will be described below.

The wire cutter consists of two bars 76 and 77 guided in the frame for reciprocal movement and tied together by blocks 78 and 79. The block 78 has a pair of cutting edges 80 and 81 each aligned with one of the bobbin terminals 16 and 17. A cam 84 on the shaft 53 moves the cutter through a lever 85 in timed sequence with respect to the wire gripper as will appear below.

A cam 88 (FIG. 2) on shaft 53 actuates a lever 89 to position a probe member 90 with respect to the spindle 19 at one state of the winding operation. The probe member 90 carries a switch 91 (FIG. 1) which detects the angular position of the spindle by determining the proper location of a hole 92 (FIG. 2) in the spindle.

Operation of the coil winding machine will be described by particular reference to FIGS. 7 through 12.

Figure 8:
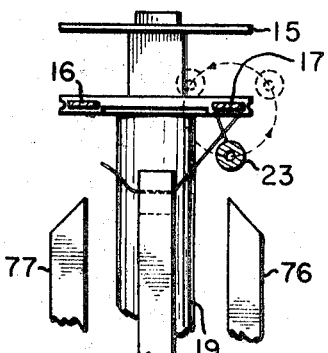
Figure 9:
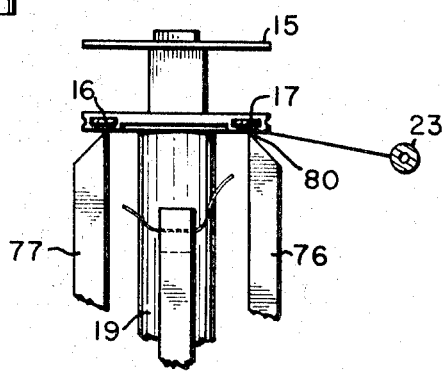

In the loading position shown in FIG. 7, the cam 52 has positioned levers 47 and 26 so that the wire guide 23 is in an intermediate position between the wire gripper 62 and the cutter 76. Likewise, arm 25 is retracted on lever 26. The end of the wire extending from the wire guide 23 is held by the wire gripper. When the operator starts the machine, the motor 55 drives the cam 52 to move the wire guide 23 to the right as seen in FIG. 8 and then drives the Geneva movement to wrap wire three times about the terminal 17. Movement of the cam 52 continues and moves the wire guide to the right as seen in FIG. 9. At this time the cutting edge 80 is moved forward (due to cam 84, FIG. 3) to press against the wire on terminal 17 and the wire gripper is moved rearwardly (due to cam 73, FIG. 3) to snap off the wire at terminal 17. The tag end of wire remains in the gripper until later. After the cutters are retracted, suitable means such as a switch is actuated by the position of cam 52 to stop motor 55. This switch, or other suitable means, is also utilized to start the level wind operation.

Figure 10:
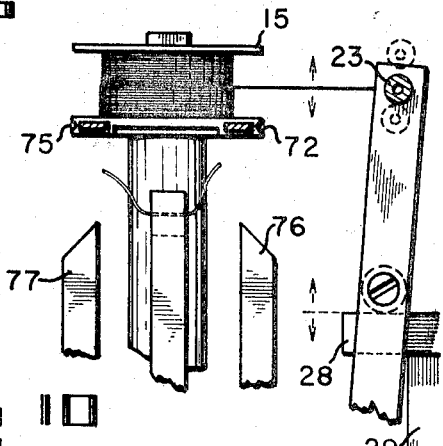

As seen in FIG. 10, abutment 28 on level wind member 29 has been driven by motor 35 to position arm 25 so that reciprocation thereof will move the wire guide 23 between the two ends of the coil. When the wire guide 23 is moved to align with the lead-in slot 72 of the bobbin, the spindle 19 will start rotating and continue to rotate until the required number of turns are placed on the bobbin. At this time the spindle will stop with the terminals downward as caused by suitable sensing means and level wind member 29 will retract to its innermost position and actuate a switch 93 (FIG. 1). Actuation of switch 93 starts motor 55 and turns cam 52 until levers 47 and 26 move the wire guide 23 to the position shown in FIG. 11. In this position lever 47 actuates a switch 95 (FIG. 1) which causes the spindle to turn an additional amount bringing the terminals to upright position to lead the wire up to the terminal 16. The cam 88 causes the probe switch 91 to check the position of the spindle to assure the proper location of the terminals, by locating hole 92 (FIG. 2) in the spindle. If the switch 91 is actuated, the shaft 53 will again rotate and Geneva movement 58 will drive the lever 26 to wrap wire around the terminal 16.

Continued movement of the cams 73 and 84 will bring the cutting edge 81 into engagement with the wire on terminal 16 (due to cam 84, FIG. 3) and move the gripper and jaw member 68 to its extreme outward position (due to cam 73, FIG. 3). In this movement, the jaws of the gripper will open, as pin 71 (FIG. 5) stops movement of member 69, to drop the tag end of wire it has been holding, and then to move jaw member 68 beyond the wire leading to the wire guide, FIG. 12. The sloping lower surface of jaw member 68 will deflect the wire so that on return movement the wire will again be caught between the two jaws. Further inward movement of the gripper will pull the wire and cause it to be snapped off at the cutting edge 81. At this point the motor 55 will be stopped by a suitable switch associated with shaft 53 and the winding operation is complete with the wire guide in the original position shown in FIG. 7. The completed coil can now be removed from the spindle and an empty bobbin put in its place.

As mentioned, previously, this cutting operation leaves the wire end flush with the terminal so that no subsequent trimming operation is required. Wire is used having insulation that melts off in later soldering operations.

For purposes of simplicity, the detailed electrical circuitry whereby the above described function is achieved is not disclosed. To summarize the operation of this circuitry, the operator first closes a switch to energize motor 55. This motor, by means of Geneva movement 58 wraps wire around terminal 17 (see FIG. 8). After the wrapping operation is completed, cam 84 and lever 85 (FIG. 3) are effective to cut the wire (see FIG. 9). After this operation has been completed one of the cams controlled by motor 55 actuates switch means to stop motor 55.

This switch means also is effective to start motor 35. Motor 35, through lever 32, is effective to move the wire guide in an upward direction from that disclosed in FIG. 9, to a point where the wire is in alignment with the lead-in slot 72 (FIG. 10) formed in the bobbin. When the lever 32 reaches this position, motor 35 is de-energized and motor 20 is energized to begin rotation of spindle 19 and bobbin 15. Further electrical means controlled by photocell 38 causes stepping motor 35 to step, continuing to move wire guide 23 in an upward direction, as shown in FIG. 10. When photocell 40 is uncovered by member 41 (FIG. 1), this photocell produces a signal to reverse the direction of movement of motor 35, whereupon the stepping motor begins stepping in the reverse direction. This alternate movement of wire guide 23 and alternate reverse in direction of movement of motor 35 continues until photocell 38 and associated counting means indicates that the required number of turns has been placed on the bobbin. When this is achieved, both motors 35 and 20 are de-energized.

Figure 11:
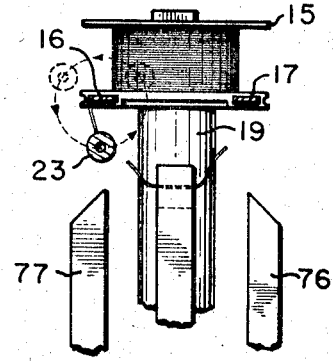
Figure 12:
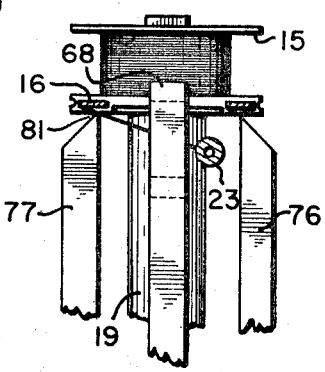

Also, an indication that the required number of turns has been placed on the bobbin is effective to energize motor 55 to move wire guide 23 to the other terminal. When the wire guide reaches this position, switch 95 closes to energize motor 20, turning the spindle as the wire is guided into the lead-out slot 75 (FIG. 10) formed in the bobbin. Switch 91 senses the position of the bobbin and when the switch is brought into alignment with hole 92 in spindle 19 (FIG. 2), motor 20 is de-energized to stop the spindle. Motor 55 continues to rotate, causing shaft 49 to turn and causing the wire to be wrapped around terminal 16 as shown in FIG. 11.

After the terminal has been wrapped, as determined by Geneva movement 58, motor 55, through shaft 53, is effective to move arm 74, causing jaw member 68 to move to an extreme position toward bobbin 15, thereby causing the jaw to drop the tag end of the wire. Jaw member 68 then returns to an inward position to pick up the wire as it comes off terminal 16. Lever 85 then moves cutter 81 into position to cut the wire, and levers 74 and 85 return to the position shown in FIG. 3 whereupon motor 55 is de-energized.

The embodiments of the invention in which an exclusive property or right is claimed are defined as follows:

1. A coil winding machine comprising, a support, a shaft journaled in said support, a first lever pivotally mounted on said shaft, a crank on said shaft, a second lever connected to said crank and lying along said first lever, cooperating abutment means on said levers at an intermediate position on said second lever to pivotally mount said second lever on said first lever and arranged to permit relative longitudinal movement thereof, first motor driven means acting between said support and said first lever for angularly positioning said first lever about the axis of said shaft, a spindle carried by said support and having an axis generally parallel to said second lever, said spindle being adapted to support a coil form having a terminal, a wire guide carried by said second lever at a position remote from the crank connection to direct wire with respect to the coil form, and second motor driven means connected to said shaft causing rotation of said crank and consequent rotation of said wire guide with respect to the coil form to wrap wire about one terminal of the wire form.

2. A coil winding machine according to claim 1 in which the cooperating abutment means on said levers consists of a pin on one of said levers extending into a slot in the other of said levers.

3. A coil winding machine according to claim 1 in which said first and second motor driven means are driven in timed sequence by a single motor.

4. A coil winding machine according to claim 1 in which said first motor driven means comprises a cam assembly in which a first cam positions said first lever, a second cam positions a cutter to engage a terminal of the coil form subsequent to its being wrapped, and a third cam positions a wire gripper to pull on the wire while said cutter engages the wire at the terminal, causing the wire to be severed at the terminal.

5. A coil winding machine according to claim 1 in which said first motor driven means also actuates a wire cutter to engage a terminal of the coil form sugsequent to its being wrapped and additionally actuates a wire gripper to pull on the wire while said cutter engages the wire at the terminal, causing the wire to be severed at the terminal.

6. A coil winding machine according to claim 1 in which said wire guide is carried on the end of said second lever so as to be movable thereon in a direction lengthwise of said second lever, third motor driven means adapted to be connected to said wire guide to cause such movement with respect to said second lever to direct wire to the coil form to level wind wire thereon, and further motor means connected to said spindle to cause concurrent rotation thereof.

7. A coil winding machine comprising, a support, a shaft journaled in said support, a first lever pivotally mounted at one end of said shaft, a crank on said shaft, a second lever pivotally mounted at one end on said crank and extending along said first lever, cooperating means on said levers to guide said second lever along said first lever and prevent relative lateral motion of said levers at an intermediate portion of said second lever, first motor driven means on said support acting on said first lever to angularly position said lever about the axis of said shaft, a spindle carried by support rotatable on an axis normal to the axis of said shaft and disposed generally parallel to said second lever, said spindle being adapted to support a coil form having spaced terminals, a wire guide carried by said second lever on the end thereof remote from the crank connection to direct wire with respect to the coil form, and second motor driven means connected to said shaft causing rotation of said crank and consequent rotation of said wire guide with respect to the coil form to wrap wire about one terminal of the wire form, said first lever being pivotally movable by said first motor driven means to position said wire guide to wrap wire about another of the terminals of the wire form.

8. A coil winding machine according to claim 7 in which said second lever has an extension slidable longitudinally of the main portion thereof and carrying said wire guide, third motor driven means acting on said extension to move said wire guide to direct wire to the coil form to level wind wire thereon, and further motor driven means acting on said spindle to cause rotation thereof as said third motor driven means drives said wire guide.

References Cited
UNITED STATES PATENTS 3,095,640 7/1963 Butterworth _____ 29—203
3,435,858 4/1969 Taysom et al. _____ 29—203X THOMAS H. EAGER, Primary Examiner